US009430017B2

(12) United States Patent
Kimura et al.

(10) Patent No.: US 9,430,017 B2
(45) Date of Patent: Aug. 30, 2016

(54) INFORMATION PROCESSING APPARATUS, INFORMATION PROCESSING METHOD, AND COMPUTER PROGRAM PRODUCT

(71) Applicant: KABUSHIKI KAISHA TOSHIBA, Minato-ku, Tokyo (JP)

(72) Inventors: Tetsuro Kimura, Tokyo (JP); Akihiro Shibata, Tokyo (JP); Tatsunori Kanai, Kanagawa (JP); Haruhiko Toyama, Kanagawa (JP); Koichi Fujisaki, Kanagawa (JP); Junichi Segawa, Kanagawa (JP); Hiroyoshi Haruki, Kanagawa (JP); Masaya Tarui, Kanagawa (JP); Satoshi Shirai, Kanagawa (JP); Yusuke Shirota, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 180 days.

(21) Appl. No.: 14/031,549

(22) Filed: Sep. 19, 2013

(65) Prior Publication Data

US 2014/0089715 A1 Mar. 27, 2014

(30) Foreign Application Priority Data

Sep. 21, 2012 (JP) ................................ 2012-208171

(51) Int. Cl.
*G06F 1/32* (2006.01)
*H02J 7/35* (2006.01)

(52) U.S. Cl.
CPC ............ *G06F 1/3203* (2013.01); *G06F 1/329* (2013.01); *G06F 1/3212* (2013.01); *H02J 7/35* (2013.01); *Y02B 60/1292* (2013.01); *Y02B 60/144* (2013.01)

(58) Field of Classification Search
CPC .... G06F 1/3203; G06F 1/3212; G06F 1/329; Y02B 60/1292; Y02B 60/144; H02J 7/35
See application file for complete search history.

(56) References Cited

U.S. PATENT DOCUMENTS

2012/0026524 A1 2/2012 Sekido et al.
2012/0246356 A1 9/2012 Shibata et al.

(Continued)

FOREIGN PATENT DOCUMENTS

JP 2004-280449 10/2004
JP 2008-199621 8/2008

(Continued)

OTHER PUBLICATIONS

Office Action of Notice of Rejection for Japanese Patent Application No. 2012-208171 Dated Apr. 7, 2015, 9 pages.

(Continued)

*Primary Examiner* — M Elamin
(74) *Attorney, Agent, or Firm* — Amin, Turocy & Watson LLP

(57) ABSTRACT

According to an embodiment, an information processing apparatus is powered by a power source including a power generation unit and a power storage device that stores power generated by the power generation unit. The information processing apparatus includes a first obtaining, a second obtaining unit, and a first control unit. The first obtaining unit is configured to obtain first information indicating a value of power generated by the power generation unit. The second obtaining unit is configured to obtain second information indicating an value of stored energy in the power storage device. The first control unit is configured to start a process that is set in advance when the value of power indicated by the first information is greater than zero and the value of stored energy indicated by the second information is equal to or greater than a first threshold value.

1 Claim, 11 Drawing Sheets

(56) References Cited

U.S. PATENT DOCUMENTS

| | | | |
|---|---|---|---|
| 2012/0246390 | A1 | 9/2012 | Kanai et al. |
| 2012/0246501 | A1 | 9/2012 | Haruki et al. |
| 2012/0246503 | A1 | 9/2012 | Fujisaki et al. |
| 2013/0073812 | A1 | 3/2013 | Kanai et al. |
| 2013/0080812 | A1 | 3/2013 | Shirota et al. |
| 2013/0080813 | A1 | 3/2013 | Tarui et al. |
| 2013/0091372 | A1 | 4/2013 | Kimura et al. |
| 2013/0191670 | A1 | 7/2013 | Haruki et al. |
| 2013/0219203 | A1 | 8/2013 | Fujisaki et al. |
| 2013/0254773 | A1 | 9/2013 | Kimura et al. |
| 2013/0268781 | A1 | 10/2013 | Kanai et al. |
| 2014/0013138 | A1 | 1/2014 | Kanai et al. |
| 2014/0013140 | A1 | 1/2014 | Segawa et al. |
| 2014/0075227 | A1 | 3/2014 | Shirota et al. |
| 2014/0077604 | A1 | 3/2014 | Shibata et al. |
| 2014/0139500 | A1 | 5/2014 | Kimura et al. |

FOREIGN PATENT DOCUMENTS

| | | |
|---|---|---|
| JP | 2009-014668 | 1/2009 |
| JP | 2009-128179 | 6/2009 |
| JP | 2011-064486 | 3/2011 |
| JP | 2011-179856 | 9/2011 |
| JP | 2012-030393 | 2/2012 |
| JP | 2013-236516 | 11/2013 |

OTHER PUBLICATIONS

Office Action for Taiwanese Patent Application No. 102133672 dated Jul. 8, 2015, 9 pages.

Japanese Office Action for Japanese Patent Application No. 2012-208171 mailed Sep. 24, 2014.

Chinese Office Action for Chinese Patent Application No. 201310419722.6 mailed on Mar. 24, 2016.

| PATH INFORMATION | ARGUMENT |
|---|---|
| /usr/bin/web_browser | -update-cache |
| /usr/bin/fetch_mail | THIRD INFORMATION |
| /usr/bin/todo_sync | THIRD INFORMATION |

THIRD INFORMATION

| PATH INFORMATION | ARGUMENT | MULTIPLE TIMES OF EXECUTION | EXECUTED |
|---|---|---|---|
| /usr/bin/epub_reader | --refresh-screen | NOT POSSIBLE | yes |
| /usr/bin/web_browser | --update-cache | POSSIBLE | yes |
| /usr/bin/fetch_mail | | POSSIBLE | no |
| /usr/bin/todo_sync | | POSSIBLE | no |

THIRD INFORMATION (each row of the path information column)

FOURTH INFORMATION (each row of the other columns)

| PATH INFORMATION | ARGUMENT | EXECUTION ALLOWING POWER |
|---|---|---|
| /usr/bin/epub_reader | --refresh-screen | 30 mW |
| /usr/bin/web_browser | --update-cache | 50 mW |
| /usr/bin/fetch_mail | | 80 mW |
| /usr/bin/todo_sync | | 40 mW |

THIRD INFORMATION (path information entries)

FIFTH INFORMATION (execution allowing power entries)

FIG.10

| PATH INFORMATION | ARGUMENT | PROCESS IDENTIFIER | EXECUTION STATUS |
|---|---|---|---|
| /usr/bin/epub_reader | --refresh-screen | | Done |
| /usr/bin/web_browser | --update-cache | 3049 | stop |
| /usr/bin/fetch_mail | | | |
| /usr/bin/todo_sync | | | |

THIRD INFORMATION
THIRD INFORMATION
THIRD INFORMATION
THIRD INFORMATION

FIG.11

| PATH INFORMATION | ARGUMENT | PROCESS IDENTIFIER | EXECUTION STATUS |
| --- | --- | --- | --- |
| /usr/bin/epub_reader | --refresh-screen | | Done |
| /usr/bin/web_browser | --update-cache | 3049 | stop |
| /usr/bin/fetch_mail | | 5623 | run |
| /usr/bin/todo_sync | | | |

THIRD INFORMATION
THIRD INFORMATION
THIRD INFORMATION
THIRD INFORMATION

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2012-208171, filed on Sep. 21, 2012; the entire contents of which are incorporated herein by reference.

FIELD

Embodiments described herein relate generally to an information processing apparatus, an information processing method, and a computer program product.

BACKGROUND

Conventionally, there is known a technique of operating a device by using power obtained by conversion by an energy conversion apparatus (for example, a solar cell) that converts energy other than electricity into power (electrical energy). With such a technique, the surplus of power obtained by conversion by an energy conversion unit such as a solar cell, for example, is stored in a capacitor or a battery. The power stored in the capacitor, the battery or the like may be used when executing a process (a task) that consumes a large amount of power, for example.

Conventionally, there are known various techniques of suppressing as much as possible consumption of power stored in the capacitor, the battery or the like. For example, regarding a mobile phone terminal, there is known, a technique of delaying execution of a task (for example, a download operation of an audio file) that consumes a large amount of power may be delayed until the terminal is connected to a charging device.

In a situation where a solar cell is generating power when a power storage device such as a capacitor or a battery capable of storing power generated by the solar cell is nearly fully charged, for example, surplus power may not be able to be stored in the power storage device, and the surplus power is wasted. There is no conventional technique of effectively using the surplus power in the situation as described above without wastefully discarding the surplus power.

BRIEF DESCRIPTION OF THE DRAWINGS

FIG. 3 is a diagram illustrating an example of data stored in a storage of the first embodiment;

FIG. 5 is diagram illustrating an example of data stored in a storage of a modification of the first embodiment;

FIG. 6 is a diagram illustrating an example of data stored in a storage of a modification of the first embodiment;

FIG. 10 is a diagram illustrating an example of data stored in a storage of the third embodiment;

FIG. 11 is a diagram illustrating an example of data stored in a storage of a modification of the third embodiment.

DETAILED DESCRIPTION

According to an embodiment, an information processing apparatus is powered by a power source including a power generation unit and a power storage device that stores power generated by the power generation unit. The information processing apparatus includes a first obtaining, a second obtaining unit, and a first control unit. The first obtaining unit is configured to obtain first information indicating a value of power generated by the power generation unit. The second obtaining unit is configured to obtain second information indicating an value of stored energy in the power storage device. The first control unit is configured to start a process that is set in advance when the value of power indicated by the first information is greater than zero and the value of stored energy indicated by the second information is equal to or greater than a first threshold value.

Various embodiments will be described in detail with reference to the accompanying drawings.

First Embodiment

Figure 1:
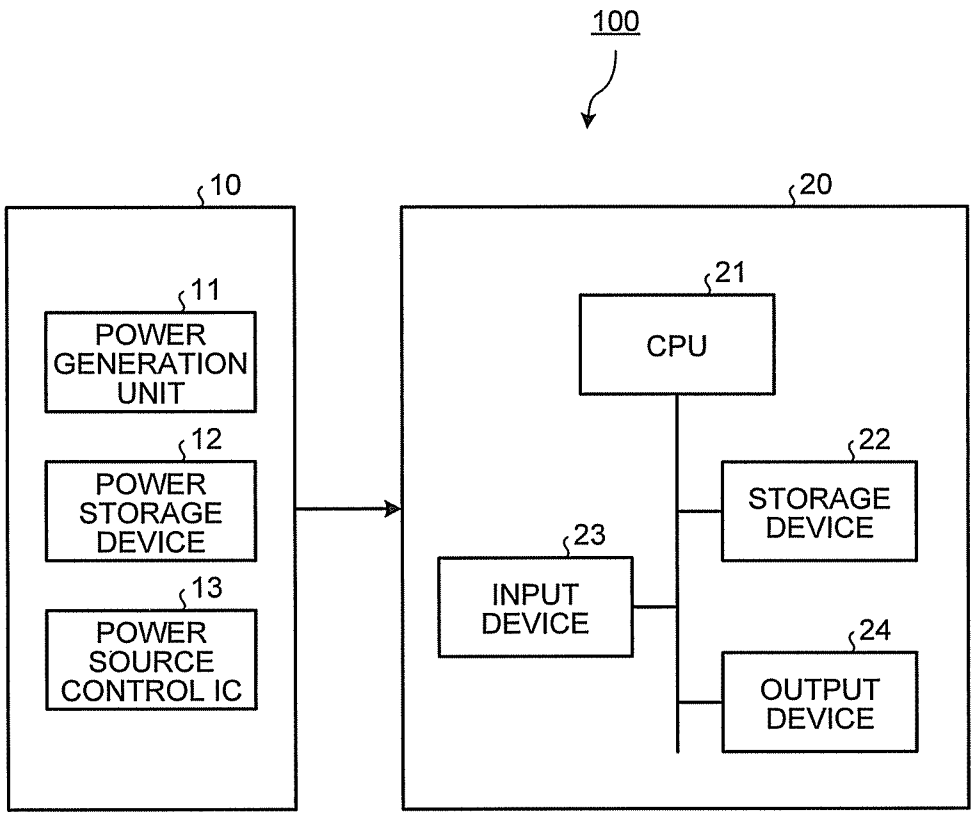
FIG. 1 is a block diagram illustrating an example of a configuration of an information processing apparatus of a first embodiment.

FIG. 1 is a block diagram illustrating an example of a configuration of an information processing apparatus 100 of a first embodiment. As illustrated in FIG. 1, the information processing apparatus 100 includes a power source 10 and an information processing unit 20.

The power source 10 is a supply source of power to be supplied to the information processing apparatus 100. The power source 10 includes a power generation unit 11, a power storage device 12, and a power source control IC 13. The power generation unit 11 generates power. In the present embodiment, the power generation unit 11 consists of an energy conversion unit that converts energy, other than electricity, received from outside the power source 10 into power (electrical energy). The power generation unit (the energy conversion unit) 11 includes a solar cell (a solar panel), a radio that receives electromagnetic waves and generates power, or the like, for example, but this is not restrictive. Furthermore, the power storage device 12 stores therein power generated by the power generation unit 11. The power storage device 12 may consist of a battery, a capacitor or the like, for example. In the present embodiment, the power storage device 12 consists of a capacitor.

In the case the power generated by the power generation unit 11 is sufficient as the power to be used (the power to be consumed) by the information processing apparatus 100, the power source control IC 13 supplies the surplus of the power generated by the power generation unit 11 (the power not used) to the power storage device 12 and charges the power storage device 12. In the case the power generated by the power generation unit 11 is not sufficient with respect to the power consumption of the information processing apparatus 100, the power source control IC 13 controls the power storage device 12 to discharge power charged in the power storage device 12. Furthermore, the power source control IC 13 includes a function of detecting the value of power generated by the power generation unit 11 (the value of power that the power generation unit 11 is capable of supplying), and a function of detecting the amount of power (the value of stored energy) stored in the power storage device 12. Here, "the value of stored energy" means the value of power currently stored in the power storage device 12. Furthermore, the power source control IC 13 may also include a function of causing interruption to a CPU 21 described later in the case the power storage device 12 is charged at up to a predetermined capacity.

The information processing unit 20 is powered by receiving supply of power from the power source 10. As illustrated in FIG. 1, the information processing unit 20 is configured as a computer device, and includes a CPU 21, a storage device 22, an input device 23, and an output device 24. The CPU 21 is a processing device capable of executing various types of processes by executing programs stored in the storage device 22. The "process" may be understood to be a function that is provided by the CPU 21 executing a program. The storage device 22 is a memory device including a non-volatile ROM, a volatile RAM, an HDD and the like, for example. In this example, the ROM included in the storage device 22 stores therein programs to be executed by the CPU 21 and data, and the RAM included in the storage device 22 functions as a work memory (a work space). The CPU 21 executes various types of processes by reading programs stored in the ROM or the like, loading the same into the RAM, and executing the same. The input device 23 is a device used by a user to perform various inputs, and may be a keyboard, a mouse and the like, for example. The output device 24 is a device for outputting a result or the like of a process performed by the CPU 21, for example, and may be a display device, a speaker or the like. The information processing unit 20 of the present embodiment may be understood to correspond to an "information processing apparatus" in claims.

Figure 2:
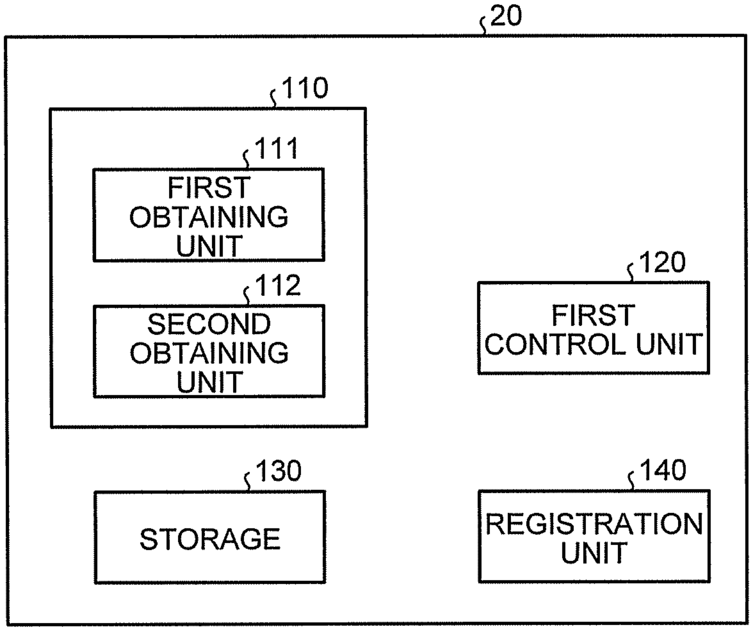
FIG. 2 is a block diagram illustrating an example of a functional configuration of an information processing unit of the first embodiment.

FIG. 2 is a block diagram illustrating an example of a functional configuration of the information processing unit 20. As illustrated in FIG. 2, the information processing unit 20 includes a power source information acquisition unit 110, a first control unit 120, a storage 130, and a registration unit 140.

The power source information acquisition unit 110 acquires power source information indicating at least the power generated by the power generation unit 11 and the value of stored energy in the power storage device 12. In the present embodiment, the power source information acquisition unit 110 includes a first obtaining unit 111 and a second obtaining unit 112. The first obtaining unit 111 obtains first information indicating the value of power generated by the power generation unit 11. Here, the "first information" indicates the value of power that the power generation unit 11 can supply at this time (the value of power that can be obtained by the power generation by the power generation unit 11 at this time). The second obtaining unit 112 obtains second information indicating the value of stored energy in the power storage device 12. In this example, the power source information described above is information including the first information and the second information.

The first control unit 120 starts a process that is set in advance, in the case the value of power indicated by the first information obtained by the first obtaining unit 111 is greater than zero (the value of power obtained at this time by the power generation by the power generation unit 11 is greater than zero), and the value of stored energy indicated by the second information obtained by the second obtaining unit 112 is equal to or greater than a first threshold value. Concrete details will be given below.

Before giving concrete details about the first control unit 120, the storage 130 will be described. The storage 130 stores one or more third information, each of which corresponding to each of one or more processes set in advance, indicating information for starting (or activating) the process. In this example, the third information is capable of specifying a task (a process) to be activated while power is being obtained by the power generation by the power generation unit 11 (while the power generation unit 11 is capable of supplying power) in the situation where the value of stored energy in the power storage device 12 is close to the maximum amount of power that can be stored in the power storage device 12 (the power storage capacity). The third information is registered in advance in the storage 130. A task is a function that is desired to be provided. An application program not yet materialized may be considered to be a "task", and one of functions of an already materialized application program (process) may be considered to be a "task".

Examples of the process to be executed when the value of stored energy in the power storage device 12 is close to the power storage capacity and power is being obtained by the power generation by the power generation unit 11 (the process to be executed using surplus power) include: wear leveling, compaction and patrol of a NAND memory; updating of a cache of a browser or the like; checking of incoming mails; synchronization for cloud applications; and refreshing for electronic paper, which are processes expected to be necessary in the future.

FIG. 3 is a diagram illustrating an example of data stored in the storage 130. In the example in FIG. 3, the storage 130 stores, for each of a plurality of processes set in advance, the third information indicating the information for starting the process. In the example in FIG. 3, path information describing the path to a file where an application program is stored may be the third information, or information in which the path information is associated with an argument indicating an initial condition for activating the application program may be the third information.

In the example in FIG. 3, three pieces of third information are stored in the storage 130. The third information in the first row is information in which path information "/usr/bin/web_browser" is associated with an argument "-update-cache", which specifies, as the process to be executed, a process for causing a browser to update a cache. The third information in the second row is path information "/usr/bin/fetch_mail", which specifies, as the process to be executed, a process for fetching a mail. The third information in the third row is path information "/usr/bin/todo_sync", which specifies, as the process to be executed, a process for causing a cloud application managing an action item to synchronize with a cloud. The types and the number of pieces of third information to be stored in the storage 130 are not restricted to the examples in FIG. 3. Furthermore, in the case a plurality of pieces of third information are registered in the storage 130, as in the example in FIG. 3, the priority may also be registered, or the order of registration may be assumed to indicate the priority. For example, the priority may be set such that the priority is higher as the third information is registered in a higher row.

As an example of the process corresponding to the third information registered in the storage 130 (the process that is set in advance) may be a specific function of a process that is in a standby state after an application program has been activated, and in this case, information for generating a trigger for causing the process to start the specific function may be registered in the storage 130 as the third information. For example, a command (an instruction) for sending a specific message or for generating a specific event may be registered in the storage 130 as the third information. In short, it is sufficient to store the third information indicating information for starting a process in the storage 130 for each of one or more processes set in advance.

Returning to FIG. 2, description will be further given. In the case the value of power indicated by the first information obtained by the first obtaining unit 111 is greater than zero, and the second information obtained by the second obtaining unit 112 indicates that the value of stored energy in the power storage device 12 is equal to or greater than the first threshold value, the first control unit 120 selects at least one process of third information stored in the storage 130, and performs control to start the process corresponding to the selected third information. Details are as follows.

The first control unit 120 may start an operation at predetermined time intervals by timer interruption, or may start an operation by the interruption from the power source control IC 13. When an operation is started by the timer interruption or the interruption from power source control IC 13, the first control unit 120 requests the power source information acquisition unit 110 for the first information indicating the value of power that the power generation unit 11 can supply at this time, and the second information indicating the value of stored energy in the power storage device 12.

The first obtaining unit 111 obtains the first information in response to the request from the first control unit 120, and transmits the obtained first information to the first control unit 120. Furthermore, the second obtaining unit 112 obtains the second information in response to the request from the first control unit 120, and transmits the obtained second information to the first control unit 120. In the case the value of power indicated by the first information obtained by the first obtaining unit 111 is greater than zero, and the value of stored energy indicated by the second information obtained by the second obtaining unit 112 is equal to or greater than the first threshold value, the first control unit 120 selects one of one or more pieces of third information stored in the storage 130. In other words, the first control unit 120 selects one process of third information stored in the storage 130. In this example, the method of selecting the third information is not fixed. The first control unit 120 may randomly (arbitrarily) select one piece of third information, or may select third information with the highest priority, for example. In this example, the first control unit 120 selects one of one or more pieces of third information stored in the storage 130, but this is not restrictive, and it is also possible to select a plurality of pieces of third information, for example.

Then, the first control unit 120 reads out the selected third information from the storage 130, and performs control to start the process corresponding to the third information which has been read out. For example, in the case the third information in the second row illustrated in FIG. 3 is selected, the first control unit 120 performs control to start the application program stored in the file indicated by the path information "/usr/bin/fetch_mail". Heretofore, concrete details of the first control unit 120 have been given.

The registration unit 140 illustrated in FIG. 2 variably sets the third information to be registered in the storage 130 according to an input of a user. The user is thereby allowed to register in advance in the storage 130 a process that is desired to be executed using surplus power. Alternatively, the registration unit 140 is not provided, and third information indicating information to start a process that is determined by the designer at the time of manufacturing as the process to be executed using surplus power is registered in advance. In short, "a process set in advance" may be a process that is set according to an input of a user, or a process that is set by the designer at the time of manufacturing.

Each of the power source information acquisition unit 110 (the first obtaining unit 111, and the second obtaining unit 112), the first control unit 120, and the registration unit 140 described above is implemented by reading out a predetermined program stored in the ROM or the like, loading the same on the RAM, and executing the same by the CPU 21. The storage 130 described above is included in the storage device 22.

Figure 4:
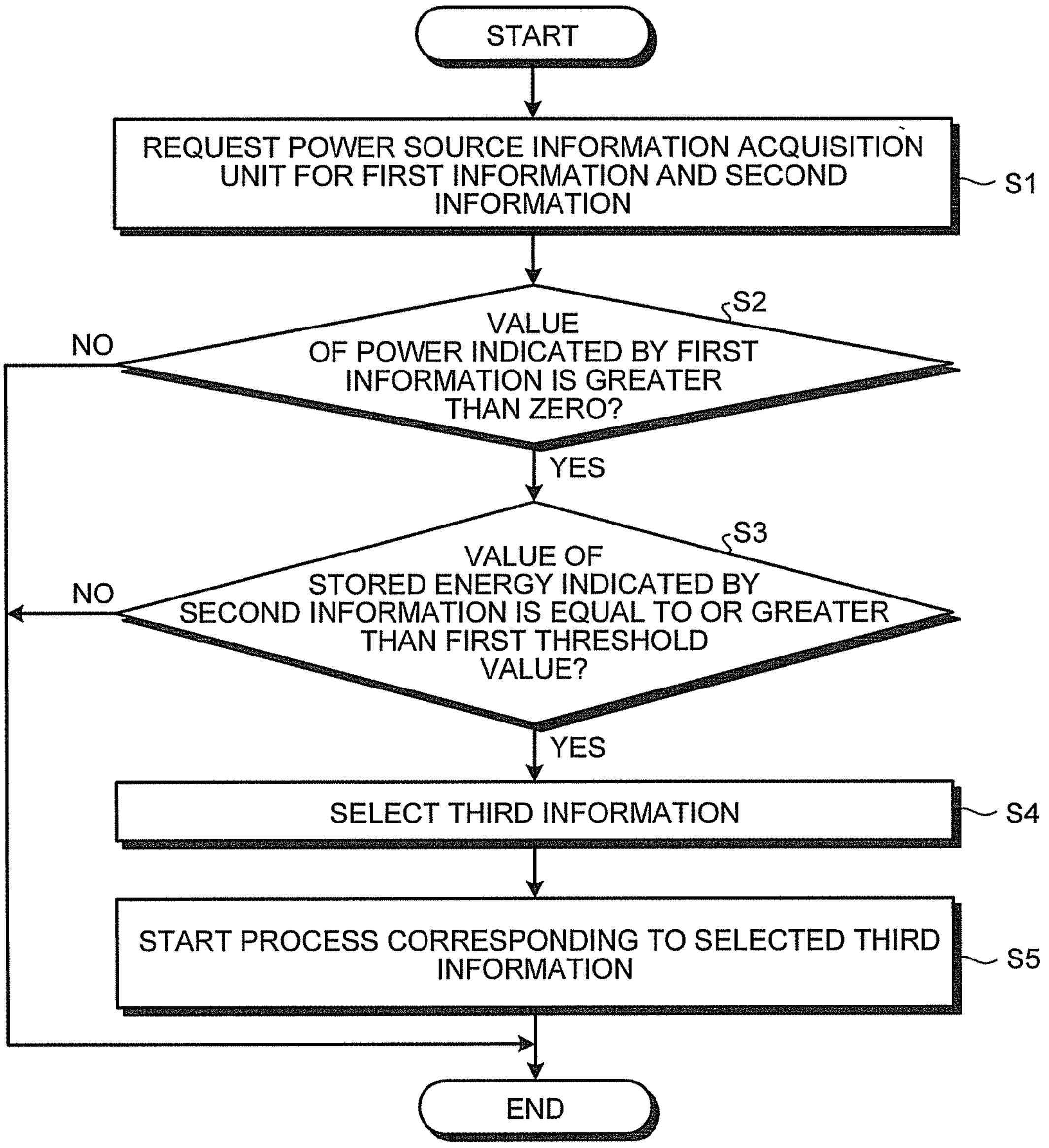
FIG. 4 is a flow chart illustrating an exemplary operation of a first control unit of the first embodiment.

Next, an exemplary operation of the first control unit 120 will be described with reference to FIG. 4. FIG. 4 is a flow chart illustrating an exemplary operation of the first control unit 120. First, when the operation is started by the timer interruption or the interruption from the power source control IC 13, the first control unit 120 requests the power source information acquisition unit 110 for the first information indicating the value of the power that the power generation unit 11 can supply at this time, and the second information indicating the value of stored energy in the power storage device 12 (step S1). Upon receiving this request, the first obtaining unit 111 obtains the first information, and transmits the obtained first information to the first control unit 120. Upon receiving this request, the second obtaining unit 112 obtains the second information, and transmits the obtained second information to the first control unit 120.

Next, the first control unit 120 determines whether the value of power indicated by the first information obtained by the first obtaining unit 111 is greater than zero or not, that is, whether power is obtained by the power generation by the power generation unit 11 at this time (step S2). In the case the value of power indicated by the first information is determined to be greater than zero (result of step S2: YES), the first control unit 120 determines whether the value of stored energy indicated by the second information obtained by the second obtaining unit 112 is equal to or greater than the first threshold value or not (step S3). In the case the value of power indicated by the first information is determined in step S2 to be zero (result of step S2: NO), the operation of the first control unit 120 is ended.

In the case the value of stored energy indicated by the second information is determined in step S3 to be equal to or greater than the first threshold value (result of step S3: YES), the first control unit 120 selects one third information from the storage 130 (step S4). Then, the first control unit 120 performs control to start a process corresponding to the third information selected in step S4 (step S5). On the other hand, in the case the value of stored energy indicated by the second information is determined in step S3 to be less than the first threshold value (result of step S3: NO), the operation of the first control unit 120 is ended.

As described above, in the present embodiment, since a process set in advance is started in the case the value of stored energy in the power storage device 12 is close to the power storage capacity of the power storage device 12, and power is being obtained by the power generation by the power generation unit 11 (in the case there is surplus power that cannot be stored), the surplus power may be effectively used, and also, a process which will be necessary in the future may be executed in advance, and accordingly, the processing speed felt by a user using the information processing apparatus 100 can be increased (the speed of execution of a process by the information processing apparatus 100), and also, the decrease in the value of stored energy in the future can be suppressed.

First Modification of First Embodiment

For example, as illustrated in FIG. 5, the storage 130 may store one or more fourth information, each of which corresponding to each of the one or more processes set in advance (four types of processes in the example in FIG. 5), indicating whether the process is capable of being executed multiple times or not and whether the process has been executed already or not.

In the example in FIG. 5, the third information in the first row is information in which path information "/usr/bin/epub_reader" is associated with an argument "--refresh-screen", which specifies, as the process to be executed, a process for causing an electronic book reader to refresh the screen. The third information in the first row is associated with fourth information indicating that the process cannot be executed multiple times, and that the process has already been executed. More specifically, the third information in the first row is associated with information indicating "not possible (negative)" with respect to an item "multiple times of execution" indicating whether a process may be executed multiple times or not and also associated with information indicating "yes (positive)" with respect to an item "executed" indicating whether the process has already been executed or not. The third information in the second row is information in which path information "/usr/bin/web_browser" is associated with an argument "--update-cache", which specifies, as the process to be executed, a process for causing a browser to update a cache. The third information in the second row is associated with fourth information indicating that the process may be executed multiple times, and that the processing has already been executed. More specifically, the third information in the second row is associated with information indicating "possible" with respect to the item "multiple times of execution" and also associated with information indicating "yes" with respect to the item "executed".

The third information in the third row is path information "/usr/bin/fetch_mail", which specifies, as the process to be executed, a process for fetching a mail. The third information in the third row is associated with fourth information indicating that the process may be executed multiple times, and that the process has not already been executed (not yet executed). More specifically, the third information in the third row is associated with information indicating "possible" with respect to the item "multiple times of execution" and also associated with information indicating "no" with respect to the item "executed". The third information in the fourth row is path information "/usr/bin/todo_sync", which specifies, as the process to be executed, a process for causing a cloud application managing an action item to synchronize with a cloud. The third information in the fourth row is associated with fourth information indicating that the process may be executed multiple times, and that the process has not already been executed. More specifically, the third information in the fourth row is associated with information indicating "possible" with respect to the item "multiple times of execution" and also associated with information indicating "no" with respect to the item "executed".

In the first modification of the first embodiment, in the case the value of power indicated by the first information obtained by the first obtaining unit 111 is greater than zero, and the value of stored energy indicated by the second information obtained by the second obtaining unit 112 is equal to or greater than the first threshold value, the first control unit 120 selects, from one or more pieces of third information stored in the storage 130, third information associated with the fourth information indicating that the process may be executed multiple times, or with the fourth information indicating that the process cannot be executed multiple times, and that the process has not already been executed, and performs control to start the process corresponding to the selected third information. The number of pieces of third information to be selected may be one or more. In this example, in the case of executing control to start a process, if the fourth information associated with the third information specifying the process indicates that the process has not already been executed, the first control unit 120 performs control to change the fourth information to indicate that the process has already been executed, and to store the fourth information which has been changed in the storage 130 in association with the third information. The fourth information in the storage 130 may also be changed by other than the first control unit 120.

Now, a case is assumed where the data illustrated in FIG. 5 is stored in the storage 130. In this case, since the fourth information associated with the third information in the first row indicates that the process cannot be executed multiple times (the item regarding "multiple times of execution" indicates "not possible"), and that the process has already been executed (the item regarding "executed" indicates "yes"), the third information in the first row cannot be selected. On the other hand, since the fourth information associated with each piece of third information in the second to fourth rows indicates that the process may be executed multiple times (the item regarding "multiple times of execution" indicates "possible"), it is possible to select any of the pieces of third information regardless of whether the process has already been executed or not (regardless of whether the item regarding "executed" indicates "yes" or "no").

With respect to a process that, if executed once in a situation where the value of stored energy in the power storage device 12 is close to the power storage capacity of the power storage device 12, and power is being obtained by the power generation by the power generation unit 11 (a situation where surplus power that cannot be stored is generated), does not have to be executed again while the situation continues, the fourth information indicating that the process cannot be executed multiple times is preferably associated with the third information indicating information to start the process. Examples of such a process include refreshing for electronic paper as well as wear leveling, compaction, and patrol of a NAND memory. On the other hand, with respect to a process that may be executed multiple times in the situation described above (the situation where the value of stored energy in the power storage device 12 is close to the power storage capacity of the power storage device 12, and where power is being obtained by the power generation by the power generation unit 11), the fourth information indicating that the process may be executed multiple times is preferably associated with the third information indicating information to start the process.

Second Modification of First Embodiment

For example, as illustrated in FIG. 6, the storage 130 may store one or more fifth information, each of which corresponding to each of the one or more processes set in advance (four types of processes in the example in FIG. 6), indicating the value of generated power (power obtained by the power generation by the power generation unit 11) that allows execution of the process (the execution allowing power).

In the example in FIG. 6, the third information in the first row is information in which path information "/usr/bin/epub_reader" is associated with an argument "--refresh-screen", which specifies, as the process to be executed, a process for causing an electronic book reader to refresh the screen. The third information in the first row is associated with fifth information indicating that the execution allowing power is "30 mW". The third information in the second row is information in which path information "/usr/bin/web_browser" is associated with an argument "--update-cache", which specifies, as the process to be executed, a process for causing a browser to update a cache. The third information in the second row is associated with fifth information indicating that the execution allowing power is "50 mW".

The third information in the third row is path information "/usr/bin/fetch_mail" and specifies, as the process to be executed, a process for fetching a mail. The third information in the third row is associated with fifth information indicating that the execution allowing power is "80 mW". The third information in the fourth row is path information "/usr/bin/todo_sync" and specifies, as the process to be executed, a process for causing a cloud application managing an action item to synchronize with a cloud. The third information in the fourth row is associated with fifth information indicating that the execution allowing power is "40 mW".

In the second modification of the first embodiment, in the case the value of power indicated by the first information obtained by the first obtaining unit 111 is greater than zero, and the value of stored energy indicated by the second information obtained by the second obtaining unit 112 is equal to or greater than the first threshold value, the first control unit 120 selects, from one or more pieces of third information stored in the storage 130, third information associated with the fifth information indicating a value equal to or less than the value of power indicated by the first information obtained by the first obtaining unit 111, and performs control to start the process corresponding to the selected third information. The number of pieces of third information to be selected may be one or more. For example, when a plurality of pieces of third information is selected, a condition may be set according to which the total of execution allowing power indicated by the fifth information associated with each piece of the plurality of third information selected is equal to or less than the value of power indicated by the first information.

As described above, in a case the value of stored energy in the power storage device 12 is close to the power storage capacity of the power storage device 12, and power is being obtained by the power generation by the power generation unit 11, a process corresponding to the third information that is associated with the fifth information indicating that the execution allowing power is equal to or less than the value of power that the power generation unit 11 can supply at this time is started, and the value of stored energy in the power storage device 12 may be prevented from being reduced due to the execution of a process that consumes power more than the currently generated power, and also, the surplus power may be effectively used.

Second Embodiment

According to a second embodiment, the first control unit 120 performs control to start a process set in advance in a case the time during which a user is not using the information processing apparatus 100 is equal to or greater than a predetermined value ("a second threshold value"), the value of power indicated by the first information is greater than zero, and the value of stored energy indicated by the second information is equal to or greater than the first threshold value. Details will be given below. Parts overlapping with the first embodiment will be omitted from the description as appropriate.

Figure 7:
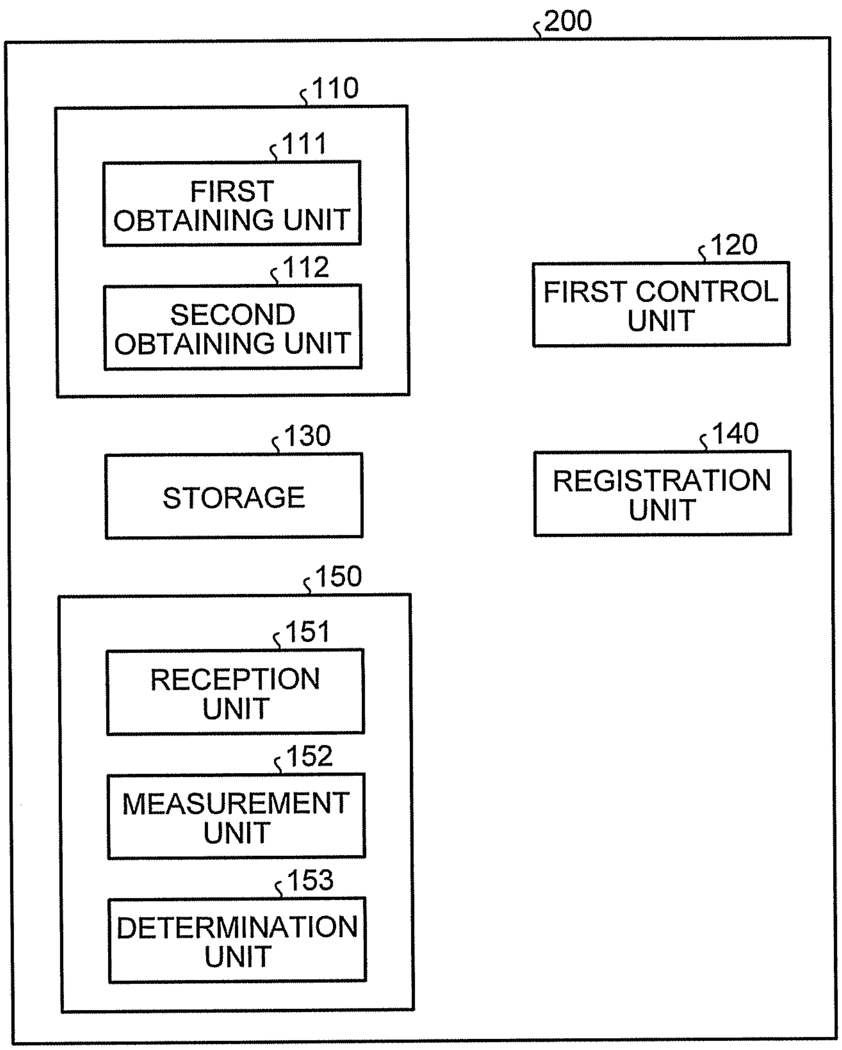
FIG. 7 is a block diagram illustrating an example of a functional configuration of an information processing unit of a second embodiment.

FIG. 7 is a block diagram illustrating an example of a functional configuration of an information processing unit 200 of the second embodiment. As illustrated in FIG. 7, the information processing unit 200 is different from the first embodiment described above in that an unused state detection unit 150 is further included. The unused state detection unit 150 includes a reception unit 151, a measurement unit 152, and a determination unit 153.

The reception unit 151 receives an input. More specifically, the reception unit 151 receives various inputs according to operation of the input device 23 by a user. The measurement unit 152 measures unused time indicating the time during which a state where an input does not occur (a state where there is no input) at the reception unit 151 continues. In the present embodiment, when an input is received at the reception unit 151 (when an input occurs), the measurement unit 152 resets a measurement value to a reference value (for example, "zero"), and starts measuring time passing by.

The determination unit 153 determines whether the unused time (time during which there is no input) measured by the measurement unit 152 is equal to or greater than the second threshold value or not. More specifically, when an inquiry about whether the reception unit 151 is in an unused state or not is received from the first control unit 120, the determination unit 153 determines whether the unused time measured by the measurement unit 152 is equal to or greater than the second threshold value or not. In this case, the unused time measured by the measurement unit 152 is the time from a time point of reception of a last input at the reception unit 151 to a time point of reception of the inquiry from the first control unit 120. In the case the unused time is less than the second threshold value, the determination unit 153 returns a determination result that the reception unit 151 is not in an unused state to the first control unit 120. Seen from a different point of view, the determination result that the reception unit 151 is not in an unused state may be said to be information indicating that the unused time is less than the second threshold value. Also, in the case the unused time is equal to or greater than the second threshold value, the determination unit 153 returns a determination result that the reception unit 151 is in an unused state to the first control unit 120. Seen from a different point of view, the determination result that the reception unit 151 is in an unused state may be said to be information indicating that the unused time is equal to or greater than the second threshold value.

Instead of resetting the measurement value to a reference value when an input is received by the reception unit 151, the measurement unit 152 may store the time of reception of the input. In this case, a difference between a time point of reception of a last input and a time point of reception of an inquiry from the first control unit 120 may be measured as the unused time. Moreover, the unused time does not have to be measured in units of seconds, minutes or the like, and may be measured using a value indicated by a counter that counts a clock used in the operation of a circuit, for example. In short, it is sufficient to measure the unused time indicating the time during which a state where an input is not received at the reception unit 151 continues.

When an operation is started by the interruption by a timer or the power source control IC 13, the first control unit 120 of the present embodiment inquires of the unused state detection unit 150 whether the reception unit 151 is in the unused state or not, and requests the power source information acquisition unit 110 for the first information indicating the value of power that the power generation unit 11 can supply at this time, and the second information indicating the value of stored energy in the power storage device 12. Upon receiving the inquiry from the first control unit 120, the determination unit 153 determines whether the unused time measured by the measurement unit 152 is equal to or greater than the second threshold value or not, and returns the determination result to the first control unit 120.

In the case the determination result returned from the unused state detection unit 150 (the determination unit 153) indicates that the reception unit 151 is in the unused state (that is, the unused time is equal to or greater than the second threshold value), the value of power indicated by the first information obtained by the first obtaining unit 111 is greater than zero, and the value of stored energy indicated by the second information obtained by the second obtaining unit 112 is equal to or greater than the first threshold value, the first control unit 120 performs control to start any of one or more processes set in advance.

Figure 8:
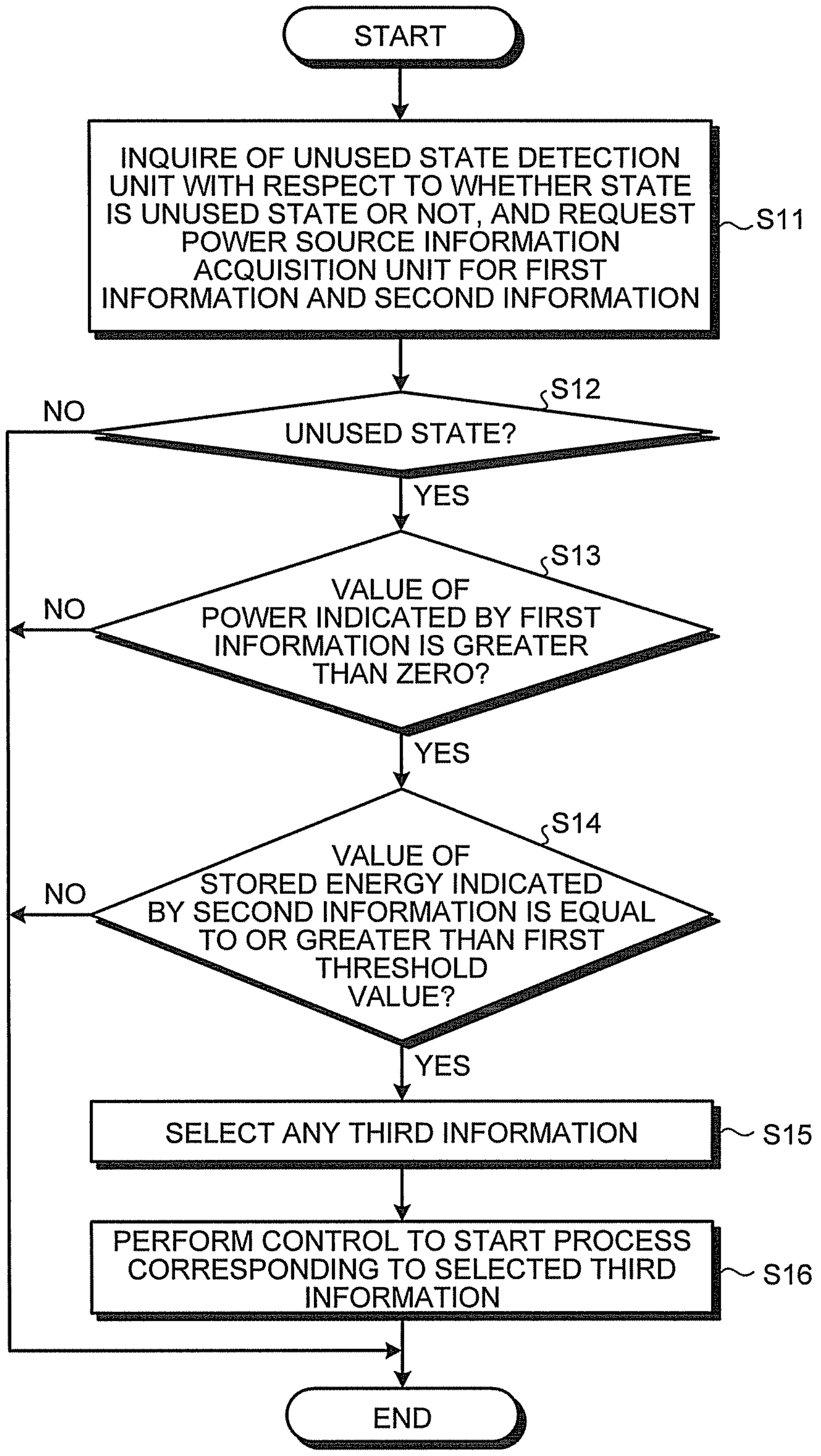
FIG. 8 is a flow chart illustrating an exemplary operation of a first control unit of the second embodiment.

Next, an exemplary operation of the first control unit 120 will be described with reference to FIG. 8. FIG. 8 is a flow chart illustrating an exemplary operation of the first control unit 120. First, when an operation is started by the interruption by a timer or the power source control IC 13, an inquiry is made to the unused state detection unit 150 with respect to whether the reception unit 151 is in the unused state or not, and a request is made to the power source information acquisition unit 110 for the first information indicating the value of power that the power generation unit 11 can supply at this time, and the second information indicating the value of stored energy in the power storage device 12 (step S11). Upon receiving the inquiry from the first control unit 120, the unused state detection unit 150 (the determination unit 153) determines whether the unused time measured by the measurement unit 152 is equal to or greater than the second threshold value or not, and returns the determination result to the first control unit 120. Also, upon receiving the request from the first control unit 120, the first obtaining unit 111 obtains the first information, and transmits the obtained first information to the first control unit 120. Also, upon receiving the request from the first control unit 120, the second obtaining unit 112 obtains the second information, and transmits the obtained second information to the first control unit 120.

Next, the first control unit 120 determines whether the determination result returned from the unused state detection unit 150 indicates the reception unit 151 is in the unused state or not, that is, whether the unused time is equal to or greater than the second threshold value or not (step S12). In the case the unused time is determined to be equal to or greater than the second threshold value (result of step S12: YES), the first control unit 120 determines whether the power value indicated by the first information obtained by the first obtaining unit 111 is greater than zero or not (step S13). The details of step S13 are the same as the details of step S2 in FIG. 4. On the other hand, in the case the unused time is determined in step S12 to be less than the second threshold value (result of step S12: NO), the operation of the first control unit 120 is ended.

In the case the power value indicated by the first information is determined in step S13 to be greater than zero (result of step S13: YES), the first control unit 120 determines whether the value of stored energy indicated by the second information obtained by the second obtaining unit 112 is equal to or greater than the first threshold value or not (step S14). The details of step S14 are the same as the details of step S3 in FIG. 4. On the other hand, in the case the power value indicated by the first information is determined in step S13 to be zero (result of step S13: NO), the operation of the first control unit 120 is ended.

In the case the value of stored energy indicated by the second information is determined in step S14 to be equal to or greater than the first threshold value (result of step S14: YES), the first control unit 120 selects one third information from the storage 130 (step S15). The details of step S15 are the same as the details of step S4 in FIG. 4. Then, the first control unit 120 performs control to start a process corresponding to the third information selected in step S15 (step S16). The details of step S16 are the same as the details of step S5 in FIG. 4. On the other hand, in the case the value of stored energy indicated by the second information is determined in step S14 to be less than the first threshold value (result of step S14: NO), the operation of the first control unit 120 is ended.

According to the second embodiment described above, if the third information indicating information for starting, as a process set in advance, a process that is to be executed based on an input from a user (for example, a process for causing a browser to update a cache or the like), for example, is registered in the storage 130, the process that is to be executed based on an input from the user is started when predetermined conditions (that the unused time is equal to or greater than the second threshold value, the value of power indicated by the first information is greater than zero, and the value of stored energy indicated by the second information is equal to or greater than the first threshold value) are satisfied even if an input of the user is not received, and accordingly, the amount of processing after the user resumes using the information processing apparatus 100 may be reduced. Thus, the speed of processing felt by the user using the information processing apparatus 100 can be increased.

Third Embodiment

A third embodiment is different from each of the embodiments described above in that a second control unit is further included, the second control unit performing control of suspending a process in a case the value of stored energy in the power storage device 12 has decreased to or below a third threshold value after the first control unit 120 has performed control to start the process set in advance, and performing control to resume, after the value of stored energy in the power storage device 12 has recovered to or above the first threshold value, the process which was suspended. That is, in the third embodiment, a process set in advance is intermittently executed so that the value of stored energy is not reduced to or below the third threshold value. Concrete details will be given below. Parts overlapping with each of the embodiments described above will be omitted from the description as appropriate.

Figure 9:
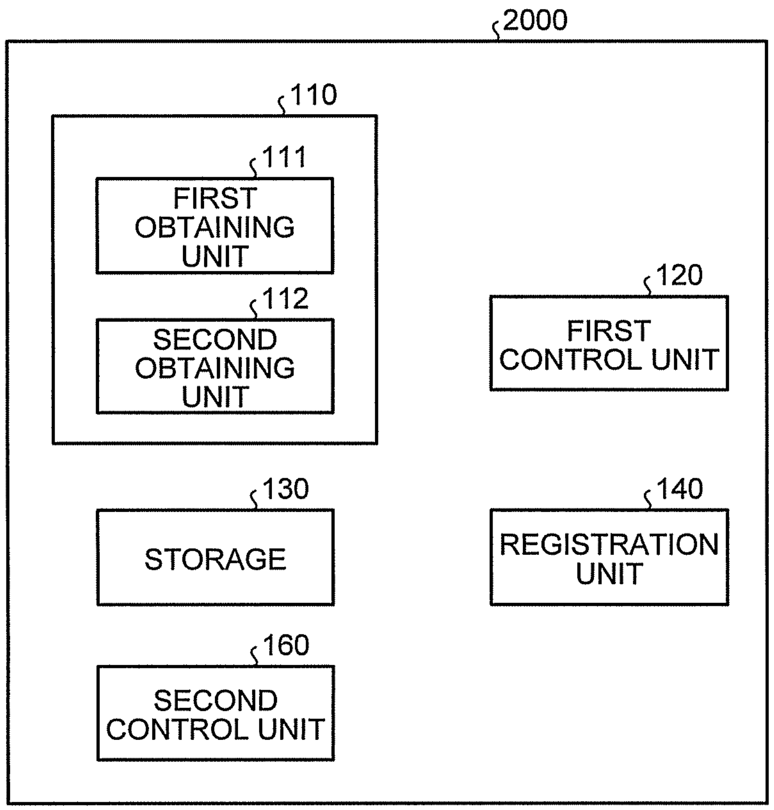
FIG. 9 is a block diagram illustrating an example of a functional configuration of an information processing unit of a third embodiment.

FIG. 9 is a block diagram illustrating an example of a functional configuration of an information processing unit 2000 of the third embodiment. As illustrated in FIG. 9, the information processing unit 2000 is different from the first embodiment described above in that it further includes a second control unit 160. The second control unit 160 monitors the value of stored energy in the power storage device 12 until a process started according to the control by the first control unit 120 is complete, and in the case the value of stored energy is reduced to or below the third threshold value, suspends the execution of the process, and resumes the execution of the process which was suspended after the value of stored energy recovers to or above the first threshold value.

The functions of suspending and resuming a process that is executed (that is, the function of controlling execution of the program) are provided by the CPU 21 executing an OS (Operating System). That is, it can be said that the OS handles the functions of suspending and resuming a process that is executed. For example, in the case of starting a certain process, the first control unit 120 requests the OS to activate the program (for example, application program) for executing the certain process. The OS activates the program whose activation is requested by the first control unit 120 and creates a process, and also, creates a process identifier (a Process ID) for identifying the created process, and notifies the first control unit 120 of the created process identifier. The first control unit 120 causes the storage 130 to store the process identifier notified from the OS in association with the third information indicating the information for starting the certain process mentioned above.

In the case of performing control to suspend a process started by the control by the first control unit 120, the second control unit 160 notifies the OS of a process identifier that is associated with third information specifying the process, and requests for suspension of the execution of the process specified by the process identifier. At this time, the second control unit 160 sets information indicating an execution status that indicates the state of the process to "stop" indicating that the process is suspended, and stores the same in the storage 130 in association with the process identifier for identifying the process whose suspension has been requested. Information "run" indicating an execution status indicates that the process is being executed, and information "Done" indicating an execution status indicates that the process has ended.

FIG. 10 is a diagram illustrating an example of data stored in the storage 130. In this example, the third information in the second row is associated with information "3049" indicating a process identifier and information "stop" indicating an execution status. That is, this illustrates that a process corresponding to the third information in the second row in which path information "/usr/bin/web_browser" is associated with an argument "--update-cache" (processing for causing a browser to update a cache is currently suspended. When execution of a process is complete, the process, and also the process identifier, ceases to exist, and thus, information indicating the process identifier is deleted, and the information indicating the execution status is set to "Done".

For example, in the case the first control unit 120 selects a plurality of pieces of third information, and performs control to start a process corresponding to each piece of third information selected (in the case a plurality of processes is to be started), information indicating a process identifier and information indicating an execution status are recorded in a plurality of rows in the storage 130, as illustrated in FIG. 11.

Moreover, with respect to the function of a task, for example, in the case a task is configured to receive suspension/resumption requests from outside, the second control unit 160 may be configured to directly issue the suspension/resumption request to a process without requesting the OS for suspension or resumption.

The timing at which the second control unit 160 monitors the value of stored energy in the power storage device 12 is arbitrary. For example, monitoring may be performed at regular intervals by setting a timer or the like, or monitoring may be performed at irregular intervals with a timing call issued by a process as a trigger.

Furthermore, programs to be executed by the CPU 21 described above may be stored on a computer connected to a network such as the Internet, and may be provided by being downloaded via the network. Also, the programs to be executed by the CPU 21 described above may be provided or distributed via a network such as the Internet. Moreover, the programs to be executed by the CPU 21 described above may be provided, being embedded in a ROM or the like in advance.

Figure 12:
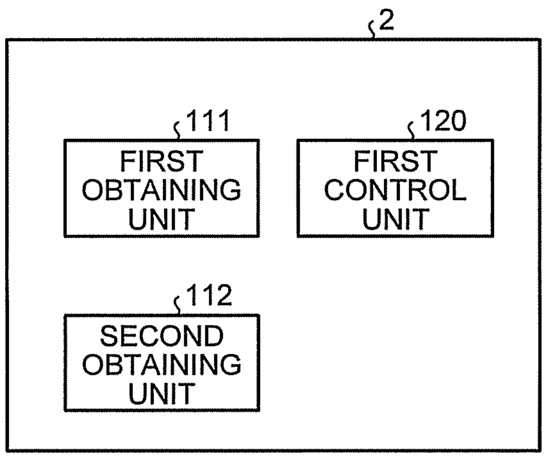
FIG. 12 is a diagram illustrating an example of a functional configuration of an information processing unit of a modification.

Furthermore, FIG. 12 is a block diagram illustrating an example of a functional configuration of an information processing unit 2 according to a, modification. As in FIG. 12, the storage 130, the registration unit 140 and the like described above may not be provided. The information processing unit 2 operates by being supplied with power by the power source 10 including the power generation unit 11 and the power storage device 12 in the same manner as in each of the embodiments described above, and corresponds to an "information processing apparatus" in the claims.

According to the information processing apparatus of at least one embodiment described above, the information processing apparatus operates by being supplied with power by the power source 10 including the power generation unit 11 and the power storage device 12 that stores power generated by the power generation unit 11. The information processing apparatus includes the first obtaining unit 111 to obtain the first information indicating the value of power generated by the power generation unit 11; the second obtaining unit 112 to obtain the second information indicating the value of stored energy in the power storage device 12; and the first control unit 120 to perform control to start a process set in advance when the value of power indicated by the first information is greater than zero, and the value of stored energy indicated by the second information is equal to greater than the first threshold value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus that is powered by a power source including a power generation unit and a power storage device that stores power generated by the power generation unit, wherein each of one or more third information corresponds to each of one or more processes set in advance and is indicative of information for starting the process;

each of one or more fourth information corresponds to each of the one or more processes set in advance and is indicative of whether the process is capable of being executed multiple times or not and whether the process has been executed already or not; and the information processing apparatus starts a process corresponding to the third information associated with the fourth information indicating that the process is capable of being executed multiple times, or starts a process corresponding to the third information associated with the fourth information indicating that the process cannot be executed multiple times and the process has not already been executed when a value of power generated by the power generation unit is greater than zero and a value of stored energy in the power storage device is equal to or greater than a first threshold value.

* * * * *